(12) United States Patent
Sajuyigbe et al.

(10) Patent No.: US 10,511,092 B2
(45) Date of Patent: Dec. 17, 2019

(54) ORBITAL ANGULAR MOMENTUM IN MILLIMETER-WAVE WIRELESS COMMUNICATION

(71) Applicant: Intel Corporation, Santa Clara, CA (US)

(72) Inventors: Adesoji J. Sajuyigbe, Mountain View, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 14/977,340

(22) Filed: Dec. 21, 2015

(65) Prior Publication Data

US 2017/0117626 A1    Apr. 27, 2017

Related U.S. Application Data

(60) Provisional application No. 62/247,027, filed on Oct. 27, 2015.

(51) Int. Cl.
*H01Q 3/26* (2006.01)
*H01Q 21/06* (2006.01)
(Continued)

(52) U.S. Cl.
CPC ............... *H01Q 3/26* (2013.01); *H01Q 1/523* (2013.01); *H01Q 15/0086* (2013.01);
(Continued)

(58) Field of Classification Search
CPC ........... H04B 7/00; H04B 7/10; H04W 16/28; H01Q 1/52; H01Q 3/26; G01S 1/02
(Continued)

(56) References Cited

U.S. PATENT DOCUMENTS 9,240,956 B2 * 1/2016 Chen ....................... H04L 47/82
9,379,926 B2 * 6/2016 Berretta ................... H04L 27/18
(Continued)

FOREIGN PATENT DOCUMENTS

GB          2410130         7/2005

OTHER PUBLICATIONS

"European Application Serial No. 16188667.6, Response filed Nov. 2, 2017 to Extended European Search Report dated Jan. 23, 2017", 35 pgs.
(Continued)

*Primary Examiner* — Harry K Liu
(74) *Attorney, Agent, or Firm* — Schwegman Lundberg & Woessner, P.A.

(57) ABSTRACT

An array of antenna elements is energized as a plurality of concentric rings of the antenna elements, each of the concentric rings energized with a respective signal from a first transceiver, the signal having a continuously varying progressive phase between the antenna elements to generate n respective electromagnetic orbital angular momentum (OAM) beams each having a respective OAM mode m where m ranges from 0 to ±n. The beams are contemporaneously generated orthogonal to each other. The circumferential phase profile of the signal for a concentric ring of α antenna elements is 2πm radians, and the progressive phase difference between each of the α antenna elements is 2πm/α radians. The first transceiver transmits the beams to a second transceiver which demodulates them and sends demodulation quality information to the first transceiver for determination of whether to transmit the beams in full multiplexing, full diversity or partial diversity.

26 Claims, 12 Drawing Sheets

(51) Int. Cl.
*H04B 7/06* (2006.01)
*H04W 72/12* (2009.01)
*H01Q 1/52* (2006.01)
*H01Q 15/00* (2006.01)
*H01Q 21/28* (2006.01)

(52) U.S. Cl.
CPC ......... *H01Q 21/061* (2013.01); *H01Q 21/065* (2013.01); *H01Q 21/28* (2013.01); *H04B 7/0617* (2013.01); *H04W 72/1263* (2013.01)

(58) Field of Classification Search
USPC .......................................................... 342/367
See application file for complete search history.

(56) References Cited

U.S. PATENT DOCUMENTS

| | | | | |
|---|---|---|---|---|
| 9,413,448 | B2* | 8/2016 | Ashrafi | H04B 7/0697 |
| 9,500,586 | B2* | 11/2016 | Ashrafi | G01N 21/17 |
| 9,692,139 | B2* | 6/2017 | Kowalevicz | H01Q 21/00 |
| 9,768,503 | B2* | 9/2017 | Klemes | H01Q 3/36 |
| 9,768,909 | B2* | 9/2017 | Huang | H04J 14/04 |
| 9,784,673 | B2* | 10/2017 | Wang | G01N 21/3504 |
| 9,794,048 | B2* | 10/2017 | Berretta | H04L 5/02 |
| 2011/0310877 | A1 | 12/2011 | Wu et al. | |

OTHER PUBLICATIONS

"European Application Serial No. 16188667.6, Communication Pursuant to Article 94(3) EPC dated Jan. 8, 2018", 10 pgs.
"European Application Serial No. 16188667.6, Extended European Search Report dated Jan. 23, 2017", 24 pgs.
Allen, L., et al., "Orbital Angular Momentum of Light and the Transformation of Laguerre-Gaussian Laser Modes", Phys. Rev. A vol. 45 No. 11, (Jun. 1, 1992), 8185-8189.
Farahani, Hossein Sarbandi, et al., "Mutual Coupling Reduction in Patch Antenna Arrays Using a UC-EBG Superstate", IEEE Antennas and Wireless Propagation Letters, vol. 9, Jan. 1, 2010, 3 pgs.
Iluz, Zeev, et al., "Microstrip Antenna Phased Array With Electromagnetic Bandgap Substrate", IEEE Transactions on Antennas and Propagation, vol. 52, No. 6, Jun. 1, 2004, 8 pgs.
Opare, Kwasi, et al., "Performance of an Ideal Wireless Orbital Angular Momentum Communication System Using Multiple-input Multiple-output Techniques", 2014 International Conference on Telecommunications and Multimedia (TEMU), IEEE Jul. 28, 2014, 6 pgs.
Tamburini, Fabrizio, et al., "Encoding many channels on the same frequency through radio vorticity: first experimental test", New Journal of Physics, vol. 14, (Mar. 1, 2012), 17 pgs.
Wang, Jian, et al., "Terabit Free-Space Data Transmission Multiplexing Employing Orbital Angular MomentumMultiplexing", Nature Photonics vol. 6, (Jun. 24, 2012), 9 pgs.
Wu, Huayang, et al., "UCA-based obital angular momentum radio beam generation and reception under different array configurations", 2014 Sixth International Conference on Wireless Communications and Signal Processing (WCSP), IEEE Oct. 21, 2014, 6 pgs.
Yang, Fan, et al., "Microstrip Antennas Integrated With Electromagnetic Band-Gap (EBG) Structures: A Low Mutual Coupling Design for Array Applications", IEEE Transactions on Antennas and Propagation, vol. 51, No. 10, part 02, Oct. 1, 2003, 11 pgs.
"European Application Serial No. 16188667.6, Response filed Apr. 9, 2018 to Communication Pursuant to Article 94(3) EPC dated Jan. 8, 2018", 20 pgs.

* cited by examiner

ORBITAL ANGULAR MOMENTUM IN MILLIMETER-WAVE WIRELESS COMMUNICATION

This application claims the benefit of priority under 35 U.S.C. 119(e) to U.S. Provisional Patent Application Ser. No. 62/247,027, filed Oct. 27, 2015, which is incorporated herein by reference in its entirety.

TECHNICAL FIELD

Some embodiments relate to wireless devices. Some embodiments relate to Institute of Electrical and Electronic Engineers (IEEE) 802.11. Some embodiments relate to IEEE 802.11ax. Some embodiments relate to wireless networks including 3GPP (Third Generation Partnership Project) networks. 3GPP LTE (Long Term Evolution) networks, 3GPP LTE-A (LTE Advanced) networks, and 3GPP LTE-Advanced Pro networks, although the scope of the embodiments is not limited in this respect. Some embodiments relate to fifth-generation (5G) communications that use millimeter wave frequencies.

BACKGROUND

The proliferation of mobile interact devices (smartphones, tablets, laptops, and other devices) as well as high bandwidth apps has led to an increasing need for wireless links with larger capacity to support real-time consumption of large amounts of multimedia data. Although the wireless networks of today provide acceptable bandwidth in many usage scenarios, there will be an exponentially increased demand for higher bandwidth in the future, as more people access even more data intensive real-time applications using their wireless devices. Such data intensive applications of the future will require backhaul, WAN, LAN, and PAN networks that can support wireless links that are 10×-1000× faster than today's links.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
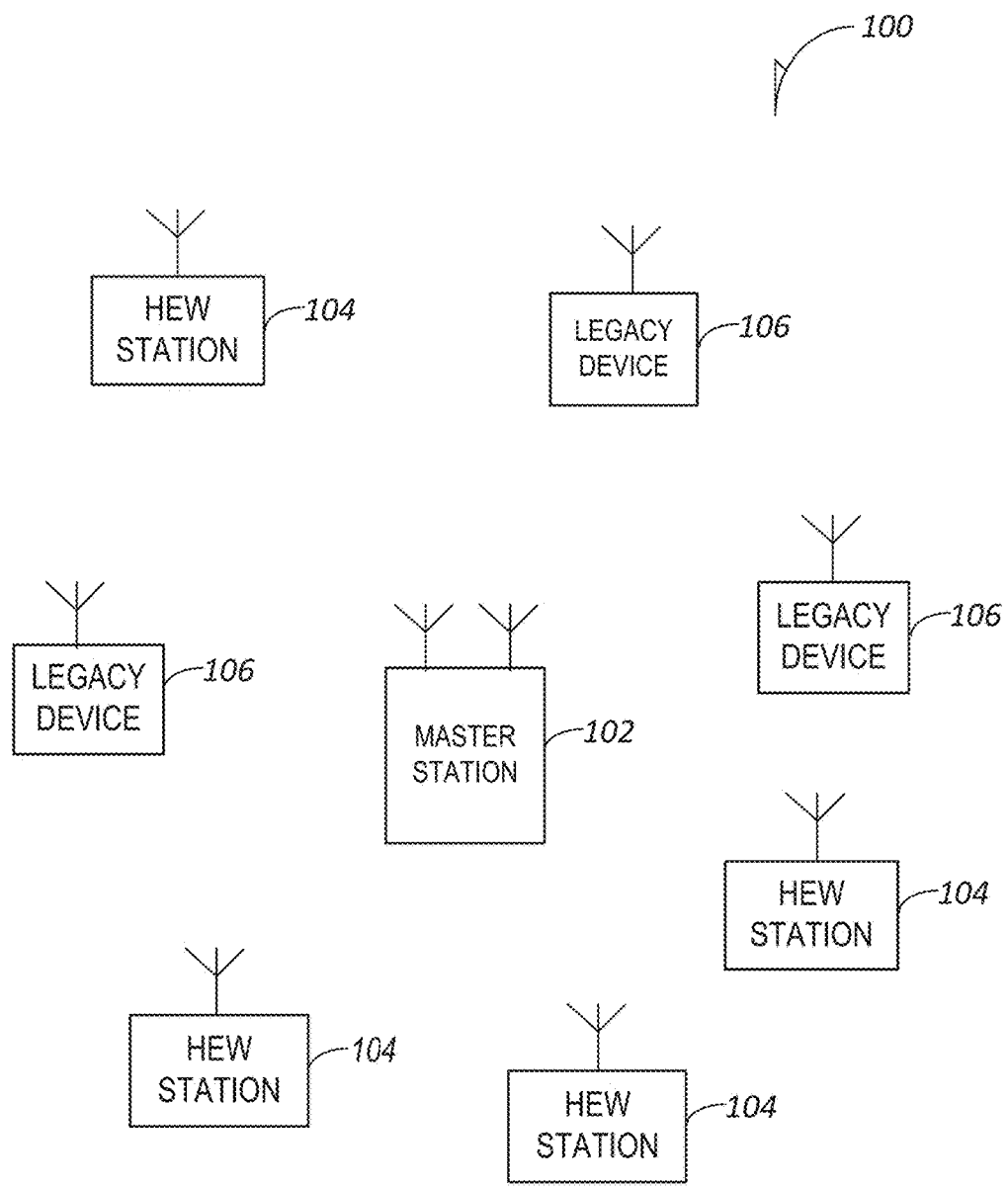
FIG. 1 illustrates a wireless network in accordance with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). In some embodiments, the 802.11 protocol may include an antenna. structure operated as one or more arrays to generate Orbital Angular Momentum OAM beams of varying OAM modes. In some LIE and 5G embodiments, the master station may operate as an enhanced node B (eNB) and the STAs may correspond to user equipment (UE).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In some embodiments a HEW frame may be configured for transmitting streams in accordance with antenna structures described herein and operated as one or more arrays or antenna structure(s) to generate Orbital Anutlar Momentum (OAM) beams of various OAM modes. In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (ISS-95), Interim Standard 856 (IS-856). Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), Bluetooth®, or other technologies.

Some embodiments relate to HEW communications. In accordance with sonic IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and subchannel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In other embodiments the HEW STAs 104 may communicate with the master station 102 in accordance with an antenna array or structure(s) of the types discussed below for generating Orbital Angular Momentum (OAM) beams of various OAM modes. This may be full multiplexing where n data streams are mapped to n OAM modes; or fewer than n data streams are mapped to n OAM modes for partial diversity and partial multiplexing; or one data stream may be mapped to n OAM modes for full diversity, depending on channel conditions and the objectives of the system as discussed more fully below.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-8.

Figure 2:
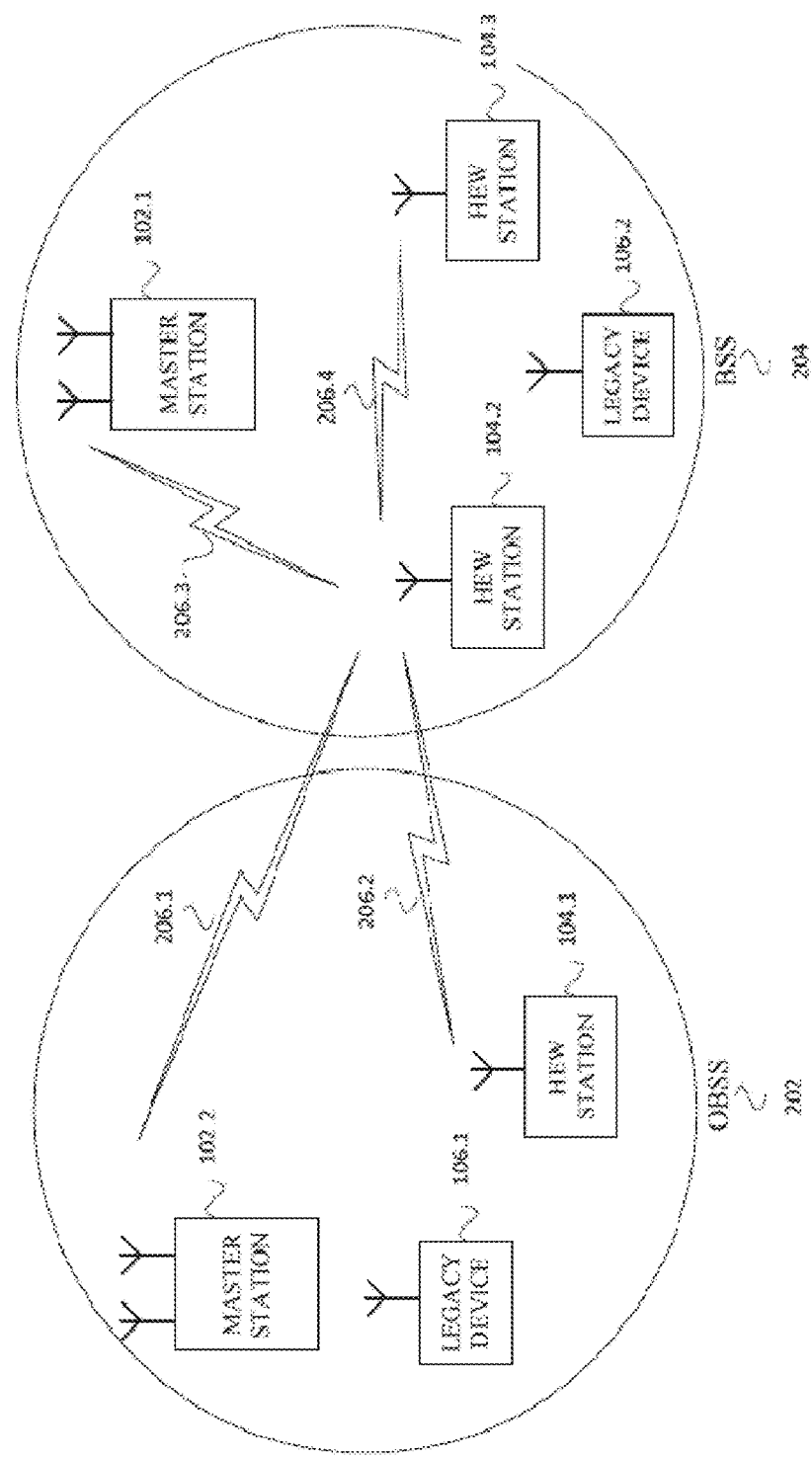
FIG. 2 illustrates a basic service set (BSS) and an overlapping basic service set (OBSS) in accordance with some embodiments.

FIG. 2 illustrates a basic service set (BSS) 204 and an overlapping basic service set (OBSS) 202 in accordance with some embodiments. Illustrated in FIG. 2 are an OBSS 202 and BSS 204. The OBSS 202 includes one or more master stations 102, one or more HEW stations 104, and one or more legacy devices 108. The HEW station 104.1 and legacy device 106.1 are associated with the master station 102.2. The master station 102.2 has an identification (not illustrated) for the OBSS 202, which may be termed a BSS identification (BSSID). In some embodiments, the identification is termed the color of the OBSS 202. The HEW station 104.1 stores a MAC address (see FIGS. 3, 4, and 5) of the master station 102.2. The OBSS 202 is a BSS 100. The OBSS 202 is termed an OBSS 202 to BSS 204 because some of the signals 206 overlap with the BSS 204.

The BSS 204 includes one or more master stations 102, one or more HEW stations 104.2, 104,3, and one or more legacy devices 106.2. The HEW stations 104.2 and 104.3 and legacy device 106.1 are associated with the master station 102.1. The master station 102.1 has an identification (not illustrated) for the BSS 204, which may be termed a BSSID. In some embodiments, the identification is termed the color of the BSS 204, The HEW stations 104.2 and 104.3 store a MAC address (see FIGS. 3, 4, and 5) of the master station 102.1.

Signal 206.1 is transmitted from the master station 102.2 and received by HEW station 104.2. Signal 206,2 is transmitted from HEW station 104.1 and received by HEW station 104.2. Signal 206.4 is transmitted from the HEW station 104.3 and received by HEW station 104.2. Signal 206.3 is transmitted by master station 102,1 and received by HEW station 104.2. The signals 206 may be packets transmitted by a master station 102, HEW station 104, legacy device 106, and/or another wireless device (not illustrated).

In some embodiments the HEW station 104 and/or master station 102 are configured to determine whether or not to use spatial re-use based on whether a signal 206 is from an OBSS 202 or BSS 204. The HEW station 104 determines whether the detected frame is an inter-BSS (OBSS 204, signals 206.1 and 206.2) or intra-BSS frame (BSS 204, signals 206.3 and 206.4) by using BSS color, which may be indicated in a physical header (e.g., SIG-A) or MAC address in the MAC header. If the detected frame is a inter BSS frame, wider predetermined conditions, the HEW station 104 uses a predetermined a power detect level of the OBSS 202 that is greater than the minimum receive sensitivity level to determine whether or not the HEW station 104 may perform an action such as spatially reuse the resource the frame is using.

For example, HEW station 104.2 may receive signal 206.2 and if the signal is below a predetermined power detect level for OBSS 202, then the HEW station 104.2 may transmit a frame that overlaps the time signal 206.2 is transmitted and may use the same or an overlapping subchannel as signal 206.2. The HEW stations 104 store the MAC address of the master stations 102.

There may be a technical problem of determining whether a packet is transmitted from a master station 102, HEW station 104, or legacy device 106 from an OBSS 202 or a BSS 204. Additionally, the HEW station 104 may not be able to determine whether a packet is transmitted from a master station 102, a HEW station 104, or legacy device 106. In some embodiments the color or BSSID is included in the packets.

Figure 3A:
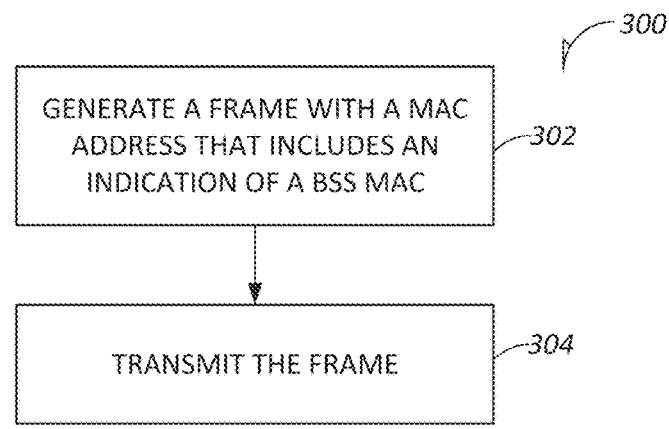
FIG. 3A illustrates a method of generating a frame with a MAC address that includes an indication of a BSS in accordance with some embodiments.

FIG. 3A illustrates a method 300 of generating a frame with a MAC address that includes an indication of a BSS in accordance with some embodiments. FIG. 3A is disclosed in conjunction with FIG. 3B-3D.

Figure 5:
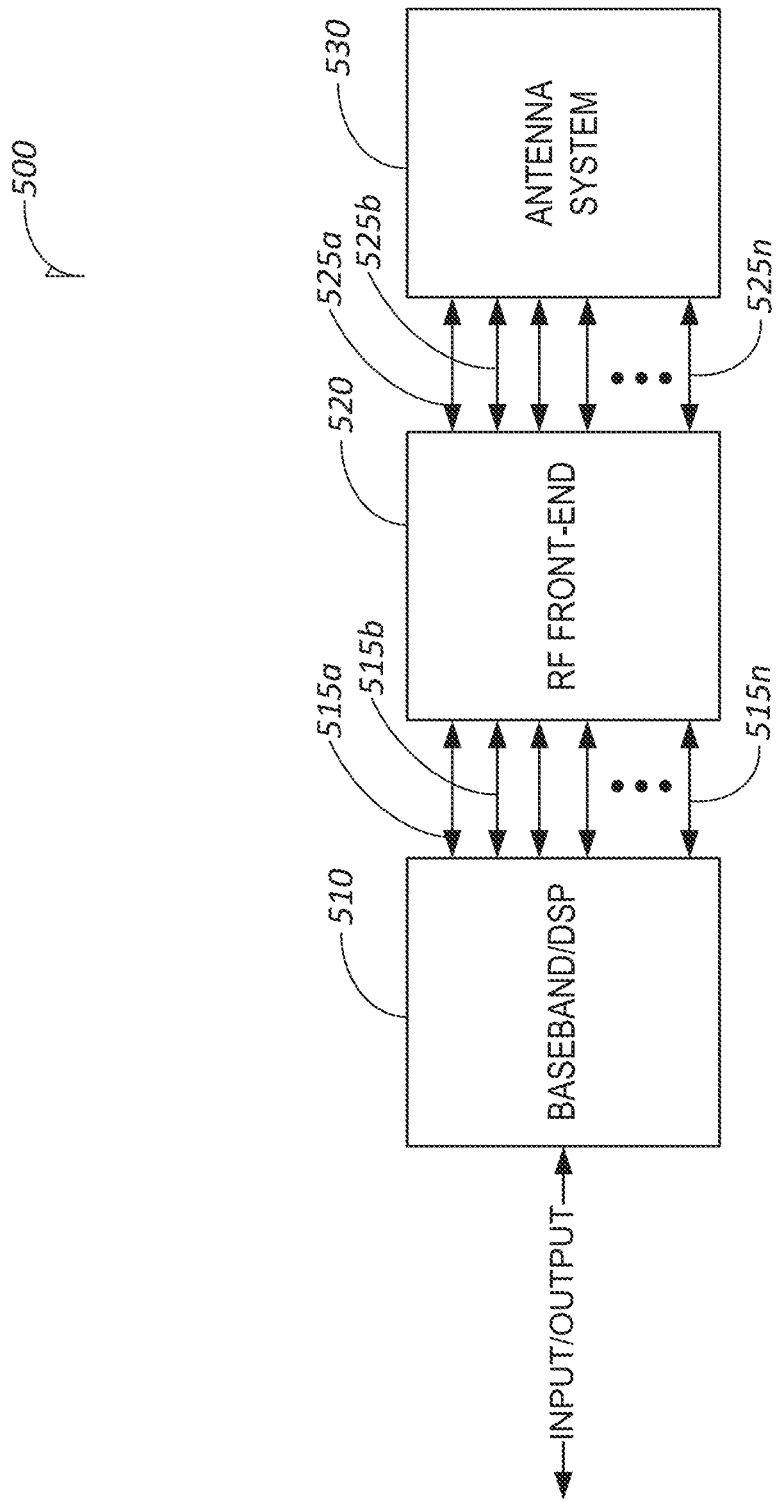
FIG. 5 illustrates a high-level system block diagram representation of an OAM system for transmitting/receiving separate data streams across one or more modes in accordance with some embodiments.
Figure 6:
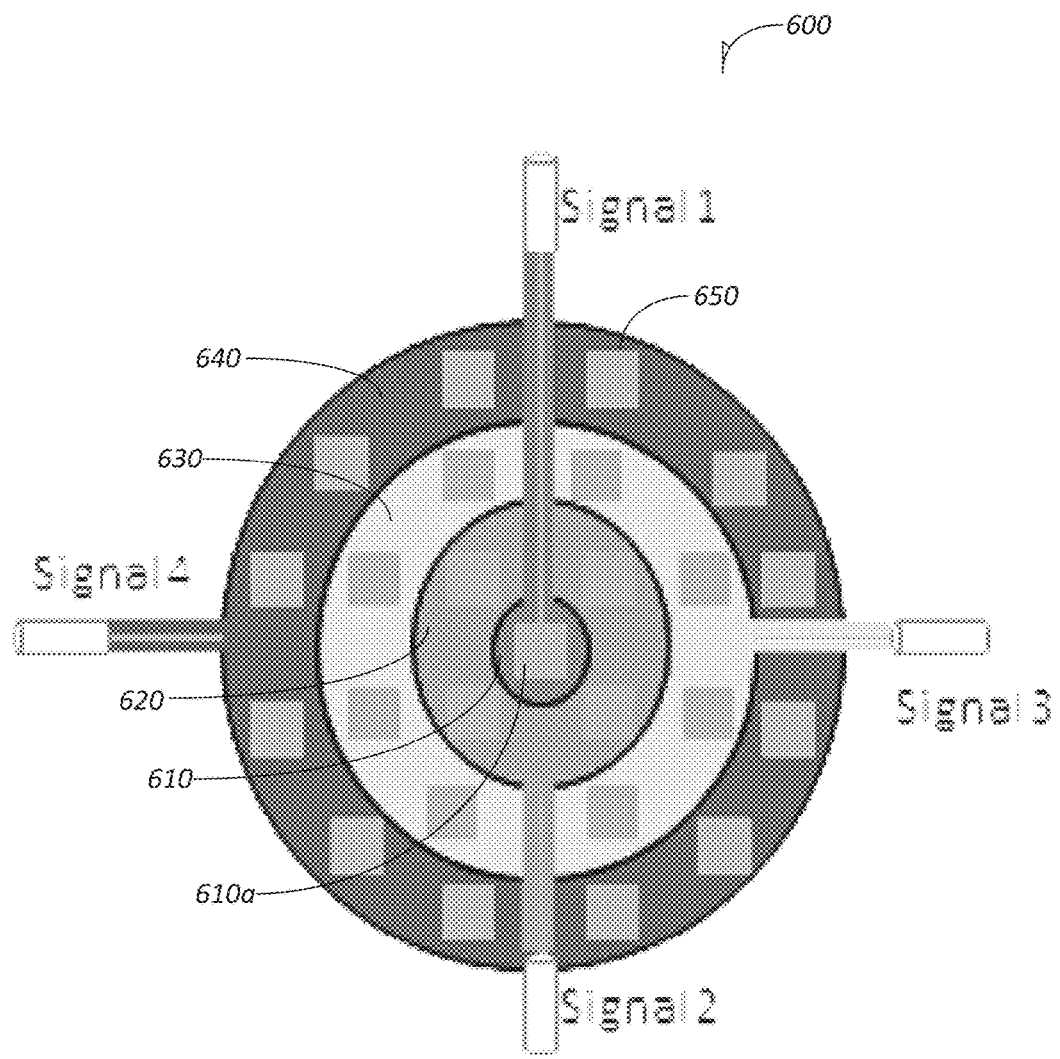
FIG. 6 illustrates a concentric antenna array to generate four OAM modes using patch antenna elements in accordance with some embodiments.

In some embodiments, the master station 102 generates a MAC address for the master station 102 that indicates the address is for a master station 102. For example, FIGS. 5 and 6 illustrate example embodiments where the MAC address indicates a MAC address is from a master station 102. This may be an indication of the BSS. For example, the HEW station 104 may then determine whether the frame is from the BSS the HEW station 104 is associated or an OBSS by comparing the MAC address with the address of the master station 102 the HEW station 104 is associated with. The master station 102 may set a locally administered bit in the MAC address to one to indicate that the master station 102 generated the MAC address.

Figure 3B:
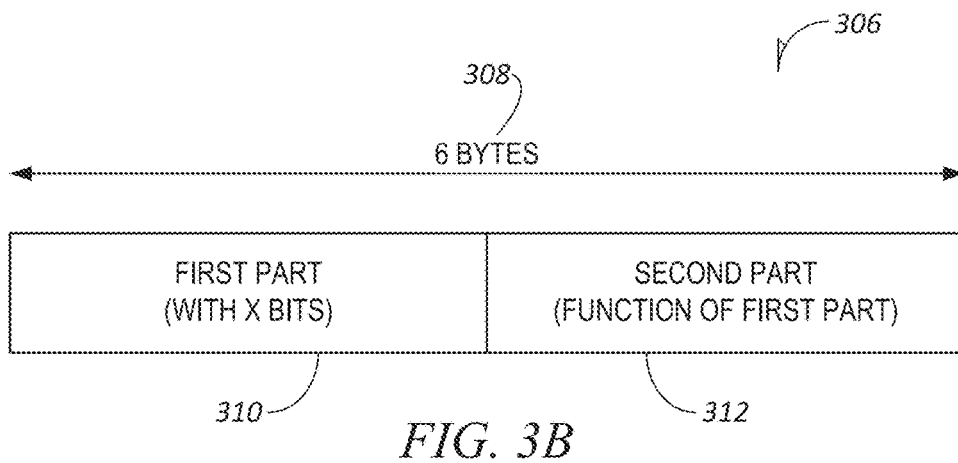
FIG. 3B illustrates an indication that a MAC address is for a master station in accordance with some embodiments.

FIG. 3B illustrates an indication that a MAC address 306 is for a master station in accordance with some embodiments. The MAC address 306 is six bytes 308 in accordance with some embodiments, The MAC address 306 is includes a first part 310 with X bits and a second part 312 that is a function of the first part 310. For example, the second part 312 may be a CRC of the first part 310. In other embodiments, the second part 312 is generated by a predetermined formula of the first part 310. A HEW station 104 may determine that the MAC address 306 is that of a master station 102 if the CRC of the first part 310 matches the second part 312. The first part 310 will guarantee uniqueness for the MAC address 306 used by master station 102 for the BSS. The number of bits X is a predetermined number. There are $2^X$ number of MAC addresses 306 that can be used by the master station 102. Further, the probability for a master station 102, HEW station 104, or legacy device 106 to have a MAC address with this format is $2^X/2^48$. When X is not too large, say 24, the probability is small, i.e., 0.000006%.

Figure 3C:
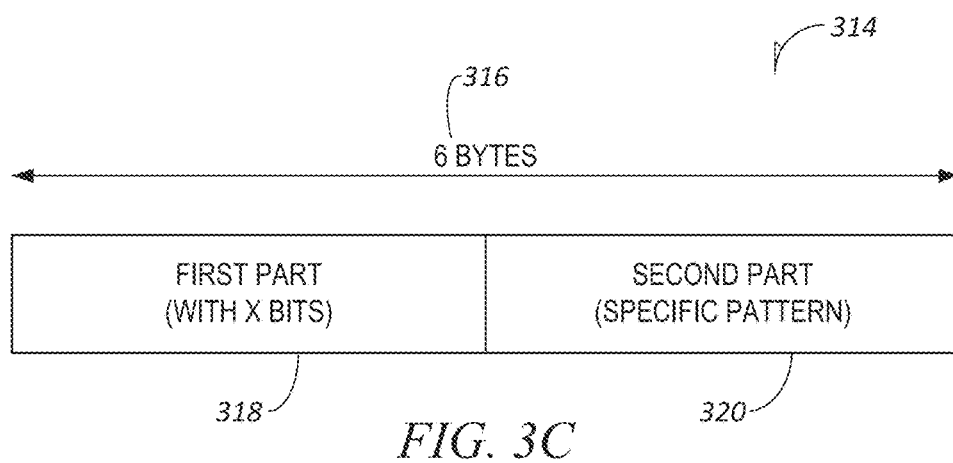
FIG. 3C illustrates an indication that a MAC address is for a master station in accordance with some embodiments.

FIG. 3C illustrates an indication that a MAC address 314 is for a master station in accordance with some embodiments. The MAC address 314 is 6 bytes 316 in accordance with some embodiments. The MAC address 314 includes a first part 318 with X bits and a second part 320 that is a predetermined pattern. A HEW station 104 determines whether the MAC address 314 is of a master station 102 by comparing the second part 320 to a specific pattern (e.g., all ones). The probability for a master station 102, HEW station 104, or legacy device 106 to have a MAC address with this format is the same as determined for FIG. 3B.

In some embodiments, if there is only one address in the frame such as a CTS frame and the address is to a master station 102, then the MAC address may have an individual/group hit set to one to indicate the MAC address is of a master station 102. The HEW station 104 may receive the CTS frame and determine the MAC address is of a master station 102 based on the individual/group bit being set to 1. The individual/group bit is then zeroed out to compare the MAC address in the CTS frame with the address of the master station 102 the HEW station 102 is associated with. The HEW station 102 can then determine if the CTS frame was transmitted from the BSS or an OBSS. The HEW stations 102 and/or legacy devices 106 are configured to not treat the MAC address with the individual/group bit set to 1 as a group frame in accordance with some embodiments.

Figure 3D:
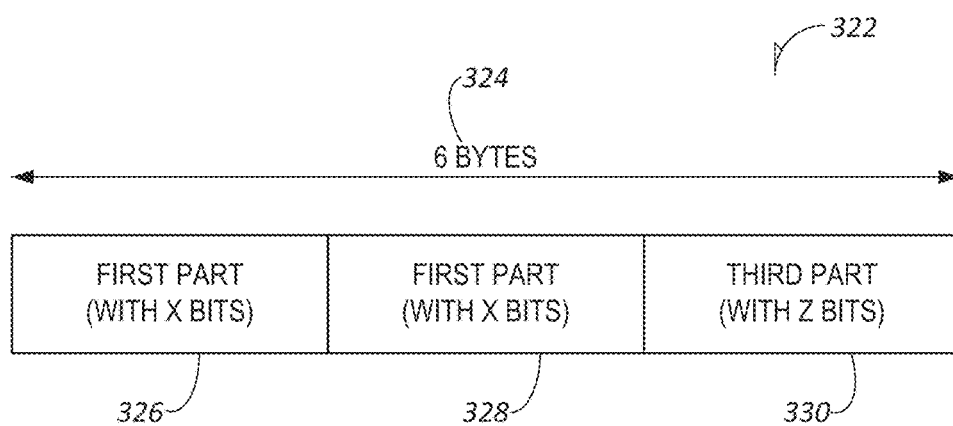
FIG. 3D illustrates a MAC address that includes an indication of a BSS in accordance with some embodiments

FIG. 3D illustrates a MAC address 322 that includes an indication of a BSS in accordance with some embodiments. Illustrated in FIG. 3D is a first part 326, second part 328, and third part 330. The MAC address 322 is six bytes 324 in accordance with some embodiments. The first part 326 is used for uniqueness for the MAC address 322 with other neighborhood MAC addresses. The second part 328 indicates a color of the BSS or a BSSID. The third part 330 indicates that the MAC address 322 is an IEEE 802.11ax MAC address 322. The third part 330 may be the CRC of the first two parts or a specific pattern to indicate IEEE 802.11ax MAC address. A master station 102 and/or HEW station 104 may be configured to receive the MAC address 322 and use the third part 330 to see if the MAC address 322 is an IEEE 802.11ax MAC address 322. The master station 102 and/or HEW station 104 can then determine the BSS color or BSSID using the second part 328.

The master station 102 and/or master station 102 may then determine whether or not the color or BSSID is an intra BSS packet or an intra BSS packet (e.g., from a OBSS). The HEW station 104 store the color or BSSID of the master station 102 the HEW station 104 is associated with. In some embodiments, X is 24 bits, Y is 8 bits, and Z is 16 bits. Using this example, the probability of a legacy device 106 to choose an IEEE 802.11ax MAC address 322 is $1/2^{(16)}$. A neighborhood can sustain $2^24$ MAC address, and there are 8 bits for color. In accordance with the MAC address 322 every MAC address 322 indicates BSSID or color, and it is not limited to the MAC address of the master station 102. In some embodiments, a master station 102 and/or HEW station 104 choose whether to use the specific MAC address 306, 314, 322, or not. In some embodiments, the master station 102 may signal to the HEW station 104 the type of MAC address 306, 314, 322 to use during association with the master station 102. The method 300 of FIG. 3A may continue at operation 304 with transmitting the frame. The method 300 may end.

Traditional wireless networks use a variety of techniques to maximize channel capacity between the transmitter and receiver. Such methods include beamforming, antenna diversity and traditional MIMO. As discussed briefly above, wireless networks of today provide acceptable bandwidth in many usage scenarios. However, there will be an exponentially increased demand for higher bandwidth in the future, as more people access even more data intensive real-time applications using their wireless devices. Such data intensive applications of the future will require backhaul, WAN, LAN, and PAN networks that can support wireless links that are 10×-1000× faster than today's links. These needs can be achieved, at least in part, by the use of Orbital Angular Momentum (DAM) wave beams to increase channel capacity. Discussed below is a method to implement OAM in a millimeter wave wireless communication system. OAM has been discussed previously in the context of free space optics but its application and implementation for millimeter-wave wireless systems as proposed herein is new. In one embodiment OAM can be used to augment currently existing short range high throughput wireless systems such as WiGig.

OAM communication pertains to using antennas to create multiple spatial modes of transmission that enable transmission of multiple orthogonal data streams, simultaneously. Multiple stream transmission has typically been done through multiple-input multiple-output (MIMO) antenna configurations in wireless communication, with n antennas at the transmitter and n antennas at the receiver, and n streams transmitted simultaneously from the transmitter as independent different data streams. Within the channel the streams interfere with each other, but they are de-multiplexed at the receiver using channel inversion and signal processing techniques.

In mm-wave implementations, there are two main differences between MIMO and OAM. Millimeter-wave signals reflect poorly off structures, therefore it is difficult to obtain a sufficient number of independent signal paths necessary to obtain good MIMO channels. While MIMO thrives in multipath-rich channels, OAM thrives in multipath-poor line-of-sight (LoS) environments. In multipath-poor line-of-sight (LoS) environments, OAM modes propagate along the same axis with minimal cross-mode interference.

Proposed here is a new way of creating an OAM system for generating and propagating multiple streams of data. The streams are transmitted using different OAM mode orders and, when generated, would be electromagnetically orthogonal to each other. The transmitted OAM beams are propagated along the same axis, yet do not interfere with each other. Consequently, the receiver merely has to detect each mode and demodulate its data contents. Since OAM mode beams are already orthogonal when they are generated, they do not depend as significantly on signal processing as do other forms of wireless transmission such as MIMO, This inherent orthogonality reduces interference. However there may still be problems introduced by non-idealities in the OAM system implementation, but these can be overcome by adaptive procedures as discussed below. For example, the antenna topology may generate imperfect OAM beams, or the transmitter and receiver may be slightly off LoS. These two scenarios would introduce interference between modes, both of which can be ameliorated using digital signal processing (DSP).

OAM may be used to great advantage for millimeter-wave and high frequency systems where it is difficult to obtain multiple-stream transmission. Consequently, OAM offers a way of creating MIMO-like transmission for high frequency channels. MIMO is best used for low frequency, but at high frequency millimeter wavelengths a transmission scheme better than MIMO is needed. Using OAM is a way of generating orthogonal modes that can transmit multiple streams over a millimeter wave channel, which would be difficult to do using MIMO techniques.

OAM has been used in research for fiber optics and for optical components using laser beams, where data can be transmitted via multiple modes propagated along the axis of a single laser beam. OAM also been discussed for lower frequencies in the literature. However, in the literature realistic wireless implementations have not been discussed. For example, in the literature people have tried to explore generating OAM beams using antenna systems. However, in those implementations the antenna system has been used to generate one OAM mode at a time. But in order to obtain the channel capacity gains that are required, there is a need to be able to generate multiple orthogonal modes at the same time along the same propagation path and/or along the same propagation environment.

As discussed above. OAM was used in optical frequency communication. But the described embodiment uses OAM for millimeter wave frequencies as well. In optics, it is easier to generate OAM modes because the transmitter and receiver apertures respectively are electrically large (i.e., thousands of times larger than the optical wavelength) thus making it easier to generate OAM modes. In the millimeter wave regime, it is difficult to generate these modes given the much smaller electrical size of the transmitter and receiver antenna apertures, and given that spatial light modulator (SLM) dielectrics would be too large and bulky to use (vis-à-vis their use in optical applications). Another challenge of OAM implementation is the generation and detection of multiple modes simultaneously, from the antenna system to the baseband/DSP both at the transmitter and at the receiver.

Disclosed is a method, system and article of manufacture that addresses the implementation of a wireless communication system to generate multiple OAM beams at millimeter wave frequencies. Using multiple OAM beams can augment the available wireless channel capacity in a millimeter wave system. Further, OAM enables a higher channel capacity because it adds an additional layer of modulation to a wireless communication system, by utilizing spatial multiplexing to create and receive orthogonal electromagnetic (EM) field radiation (i.e., OAM modes) at the transmitter and receiver, respectively. Consequently, a single physical channel may be used to obtain a channel capacity that is a multiple of how many OAM "modes" one can reliably generate and receive.

Orbital angular momentum (OAM) is an electromagnetic wave phenomenon in which a wave front propagates with helical phase fronts with $2\pi m$ phase shifts, with m being an integer that represents the mode order. Various research works have demonstrated that OAM beams of different orders are orthogonal and therefore, ideally, do not interfere with each other. This means that an OAM beam of order m=0, for instance, does not interact with any other OAM mode order even with all modes propagating along the same axis within the same physical "free space" channel at essentially the same time. In reality, however, due to engineering limitations and channel impairments, OAM anodes may experience crosstalk due to anode generation artifacts as well as channel multipath and reflection effects. In spite of these non-idealities, OAM is an excellent candidate transmission technology for high throughput data links in which there is line of sight between the transmitter and receiver, particularly short range communications like WiGig.

OAM is also favored in multipath-poor LoS scenarios because the mode crosstalk is minimal in which case and channel capacity is multiplied compared to a traditional spatially-multiplexed line of sight link (e.g., conventional MIMO).

Figure 4:
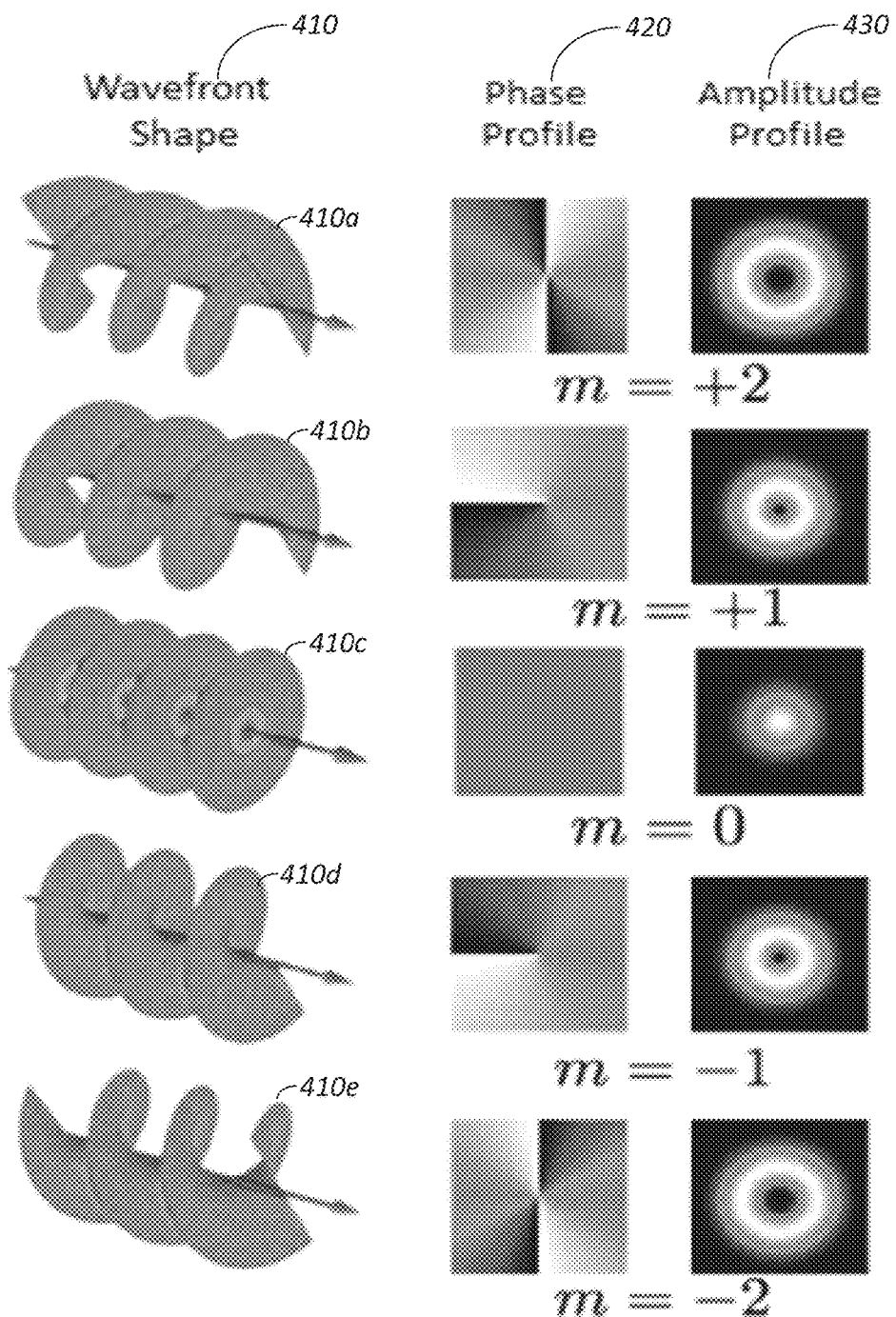
FIG. 4 illustrates several OAM modes in accordance with sonic embodiments.

FIG. 4 illustrates several OAM modes, in accordance with some embodiments. The left column 410 depicts OAM modes 410a, 410b, ..., 410e propagating in free space. The spiral propagation pattern of wavefronts can be observed. The middle column 420 illustrates the phase profile of a planar cross section of the wavefront for each mode. The right column 430 shows the amplitude profile for each of the propagating OAM wavefronts for each mode. To generate and receive OAM modes in wireless communication an appropriate radio system communication architecture would address OAM antenna, topology, mode generation/reception topology and multi-OAM signaling. OAM communication system architecture is both similar to and different from a conventional wireless communication system. Like a conventional wireless communication system, an OAM communication system comprises traditional system blocks such as the baseband components for digital signal processing, RF front end components comprising RF elements such as filters, amplifiers, local oscillators, mixers, and other components, and the antenna system. This is discussed in more detail below.

The method of implementation of the OAM system determines the system architecture, depending on the OAM mode transmission technique. The OAM communication system may be used to transmit separate data streams across different OAM modes, or to transmit one single data stream across multiple modes in order to provide space diversity to mitigate a fading channel caused by multipath issues. Further, the system may be adaptable to a configuration in between these two transmission types. In one embodiment, n data streams could be mapped to n modes, which may be referred to as full multiplexing. In another embodiment, fewer than n data streams could be mapped to n OAM modes, providing partial diversity and partial multiplexing. In yet another embodiment one data stream could be mapped to n modes, which may be referred to as full diversity.

Multiplexing fewer streams to a higher number of modes will help improve mode separation through DSP, and is recommended when reliability is more important than throughput. Multiplexing the same number of streams to the same number of modes is a way of creating orthogonal diversity paths, and will be typically used when higher data rates are the priority. In general, OAM system architecture can be designed to allow one or more data signals to be multiplexed to one or more anodes, ranging from full spatial multiplexing to diversity transmission. For easier demodulation and lower design complexity at the receiver, the transmitter can signal to the receiver how many data streams were multiplexed. In addition, the receiver can feed back demodulation quality information (through BER, for instance) so that transmitter can adapt the multiplexing order. The receiver can also feed back to the transmitter a recommendation of how many multiplexing streams to transmit since it has knowledge of the quality of all the OAM modes it receives.

FIG. 5 illustrates a high level system block diagram representation of an OAM transceiver 500 for transmitting/receiving separate data streams across one or more modes in accordance with some embodiments. The number of connections, or data paths, sometimes referred to as "RF chains" between system blocks is determined by the maximum number of OAM modes that the antenna system can support. System 500 comprises baseband/DSP component 510, RF front end 520 and antenna system 530. The system has n data paths 515a, 515b, ..., 515n for n RF chains between baseband/DSP component 510 and the RF front end 520. There are also the same number, n, of data paths 525a, 525b, ..., 525n between RF front end 520 and antenna system 530. Multiple data stream multiplexing across one or more multiple OAM modes is illustrated in FIG. 5. The system would, as is usual, include a digital to analog converter (DAC), not shown for space-saving reasons, for each data path connection in the baseband/DAP component 510. For full multiplexing, several RF chains are needed to generate and curate the independent data streams. For transmit/receive flexibility this configuration of n data paths 515a, 515b, ..., 515n and 525a, 525b, ..., 525n is used in FIG. 5 for full multiplexing capability, even if a full diversity OAM configuration (one data stream mapped to n modes) were used at times. In other words, because the system must be able to handle full multiplexing with n data streams mapped to n modes, the system architecture would include capability for n RF chains even though channel conditions may suggest the need for partial diversity or full diversity from time to time.

Multiple RF chains may be implemented in one single RF IC, regardless of the number of RF chains for example as the RF Front End 520. The output of the RF front end 520 will be passed to the baseband/DSP block 510 for signal processing. The antenna system block 530 in FIG. 5 may be implemented using an antenna or antennas that can independently generate separate OAM beams to transmit/receive the separate data streams. As discussed above, the environment may distort the mode structures, because of non-ideal conditions that induce crosstalk among otherwise orthogonal modes. The DSP portion of component 510 would utilize standard signal processing techniques to remove the crosstalk between the digital signal streams recovered from the separate OAM modes. For example, the system would, as is usual, include a Digital to Analog Converter (DAC), not shown, for each RF chain in the baseband/DAP component 510. This DSP function of component 510 would be utilized to maximize the channel capacity across the different modes, in view of the fact that the different OAM modes would have been affected differently by the environment.

FIG. 6 illustrates an example of concentric antenna array to generate four OAM modes using patch antenna elements in accordance with some embodiments. The illustrated antenna embodiment may use concentric rings of circular antenna arrays to generate separate OAM modes. Each concentric antenna array ring would generate a different mode, the total number of modes desired dictate the number of concentric rings used. Each of the concentric antenna array rings 610, 620, 630, 640 could be made of any type of antenna element. The squares, such as square 650, represent square patch antennas. However, circular or other geometries of patch antennas may be used. Further, patch antennas are not a requirement as any type of antenna that behaves as discussed below can be used. Furthermore, some embodiments may use other than concentric rings of antennas.

Each antenna ring 610, 620, 630, 640 can be used to generate an independent OAM mode by stimulating each antenna element with a slightly different phase profile so that the total circumferential phase profile is $2\pi m$, where m represents the mode order that is being generated. Higher order modes are best generated on the outer antenna array rings. In FIG. 6 the first antenna ring 610 comprises the center antenna element illustrated as a single square patch antenna 610a. The second antenna ring is the four antenna array in circle 620. The third antenna ring is at 630 and comprises eight antennas. The fourth antenna ring 640 comprises twelve antennas. More or fewer antennas may be used per ring so long as the phase excitation of the antennas described below is maintained. It is desirable to use as many antenna elements as possible to generate each mode. However the maximum number of antenna elements is determined by the perimeter of the array ring. A larger array ring perimeter reduces the mode path loss of whichever modes are being transmitted.

OAM modes range from 0 to ±∞. In practice, higher order modes have very large divergence and thus experience high attenuation. Therefore it is typically the first mode order (m=0, traditional plane wave) and the next few modes (±1 to a finite number) that are valuable for improved transmission. Positive mode orders and negative mode orders are qualitatively similar. The difference between positive and negative mode orders is that positive mode orders have a clockwise phase rotation while negative mode orders have a counterclockwise phase rotation. To generate an OAM mode for any of the concentric patch antenna array rings of FIG. 6, a phase shift of $2\pi m$ radians divided by the number of antenna elements is applied. For example, the m=+1 (or m=−1) OAM mode would be generated by the ring 620 comprising four patch antenna elements (indicated by the four squares in ring 620). The phase difference between each of the four antenna elements would be $+2\pi/4$ radians, i.e., $+\pi/2$ radians (or $-\pi/2$ radians for m=−1 mode order). The next ring 630, comprising eight elements, would generate the m=+2 (or m=−2) mode, thus the phase difference between each element would also be $+\pi/2$ radians (or $-\pi/2$ radians for m=−2). To generate the m=3 mode the outer most ring, with twelve elements, would also have a. phase separation of $+\pi/2$ radians (or $-\pi/2$ radians for m=−3) between elements. The m=0 OAM mode is a traditional plane wave mode in the far field, and this would be generated by the innermost antenna 610a. In general, a respective concentric ring of antenna elements may be energized with a respective signal having a continuously varying progressive phase between the antenna elements. The phase difference between antenna elements in a concentric ring of α antenna elements is $2\pi m/\alpha$ where in is the OAM mode generated by the concentric ring.

Embodiments are not limited to concentric arrays. Any antenna system that can generate and receive OAM modes (e.g., any antenna structure(s) that can be used to generate helical phase fronts) may be used. For example, another embodiment may comprise a large square array, which may be a 16 by 16 antenna array, or even a rectangular array. In other words, an alternate embodiment could be an antenna structure other than a circular array so long as the structure can be made to take on, in operation, a circular arrangement of antenna elements. The phase across the circular arrangement would be modified in order to generate each mode along each circumference. Stated another way, if one drew several imaginary concentric circles of different radius on the surface of the square array under discussion, all the antenna elements that a first circle intersects or includes would be the antennas that would generate a specific mode along that first circle. Then, the antennas that a second circle intersects would be the antennas that generate a second mode. One can do that repeatedly for different circles of different radii to generate different OAM modes. In other words one could essentially operate a standard 16 by 16 array in the same manner in which one operates the circular array of FIG. 6.

Figure 6A:
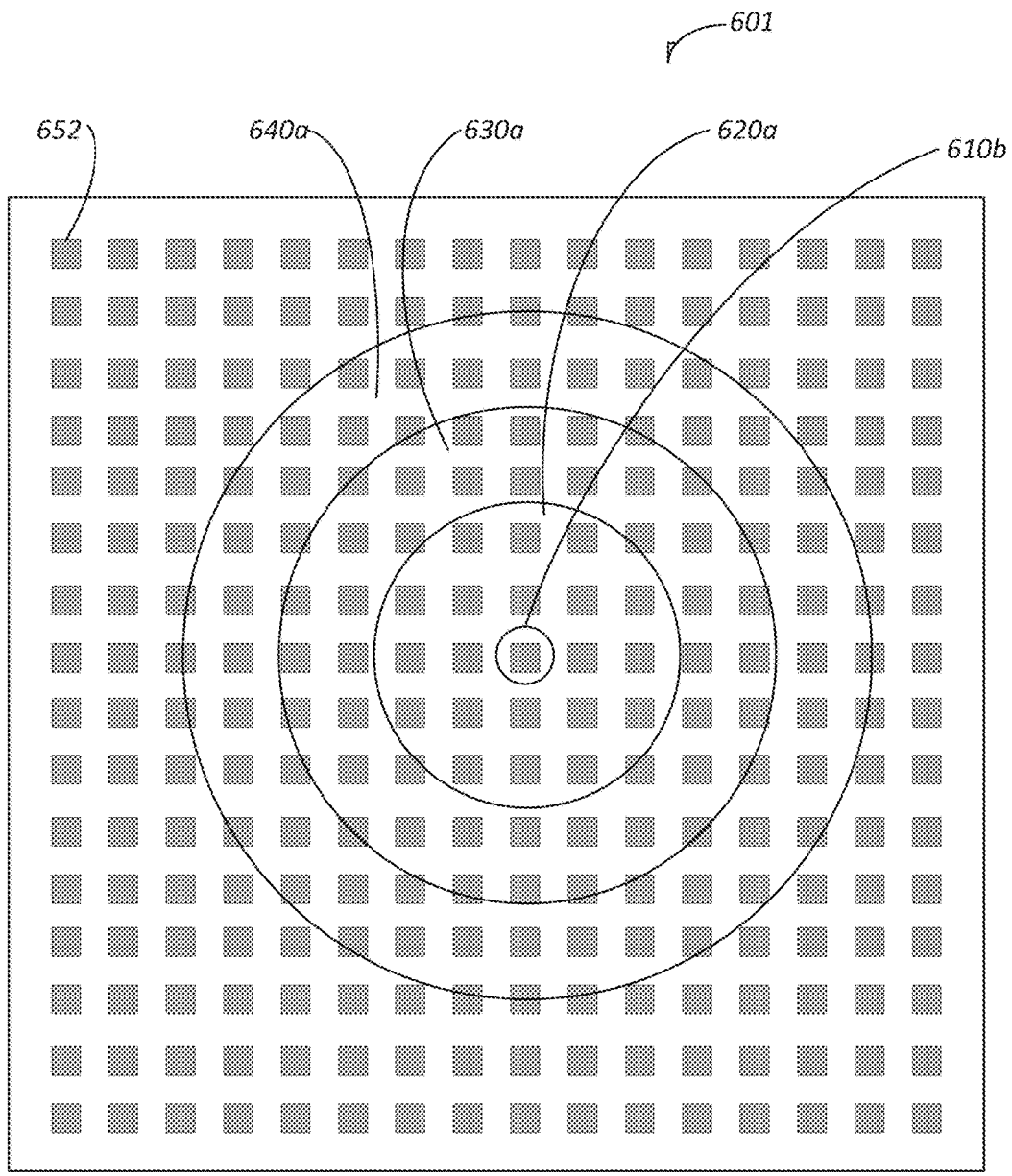
FIG. 6A illustrates a square array of antenna elements that may be used to generate OAM modes using patch antenna elements in accordance with some embodiments.

For example, FIG. 6A illustrates a square array of antenna elements that may be used to generate OAM modes using patch antenna elements in accordance with some embodiments. The square array 650 comprises 16 by 16 antenna elements, such as the patch antenna element 652. As discussed above, the antenna elements are not limited to patch antennas but could be any type of antenna element that can meet the requirements of OAM beam generation discussed herein. One could generate a number of OAM modes in the 16×16 array of FIG. 6A so long as the phase variation across approximate circles of antenna elements selected within that array is as discussed above for OAM beam generation. In FIG. 6A the first antenna ring 610b comprises the center antenna element illustrated as a single square patch antenna. The second concentric antenna ring is in circle 620a. The third antenna ring is in circle 630a. The fourth antenna ring is in circle 640a. It is noted that the antenna elements in each ring 620a, 630a and 640a are not the same number of antenna elements as in concentric rings 620, 630, and 640 of FIG. 6. This is because FIG. 6A illustrates a square array of antenna elements. However, the appropriate antenna elements within each concentric rings 620a, 630a, and 640a can be selected and electrically energized to approximate the phase variation across approximate circles of antenna elements within that array is as discussed above for FIG. 6. Yet another embodiment could use a rectangular array and use the antenna elements within that rectangular array configured to energize the antenna elements of the rectangular array in groups of circular sub-elements as discussed above with respect to a square array.

One advantage to the disclosed implementations is that RF front ends with multiple RF chains would be enabled to support a multiplicity of modes. Additional uses include small cells, wireless backhaul, wireless data centers, and the like, wherever increased data rates are desired.

Figure 7:
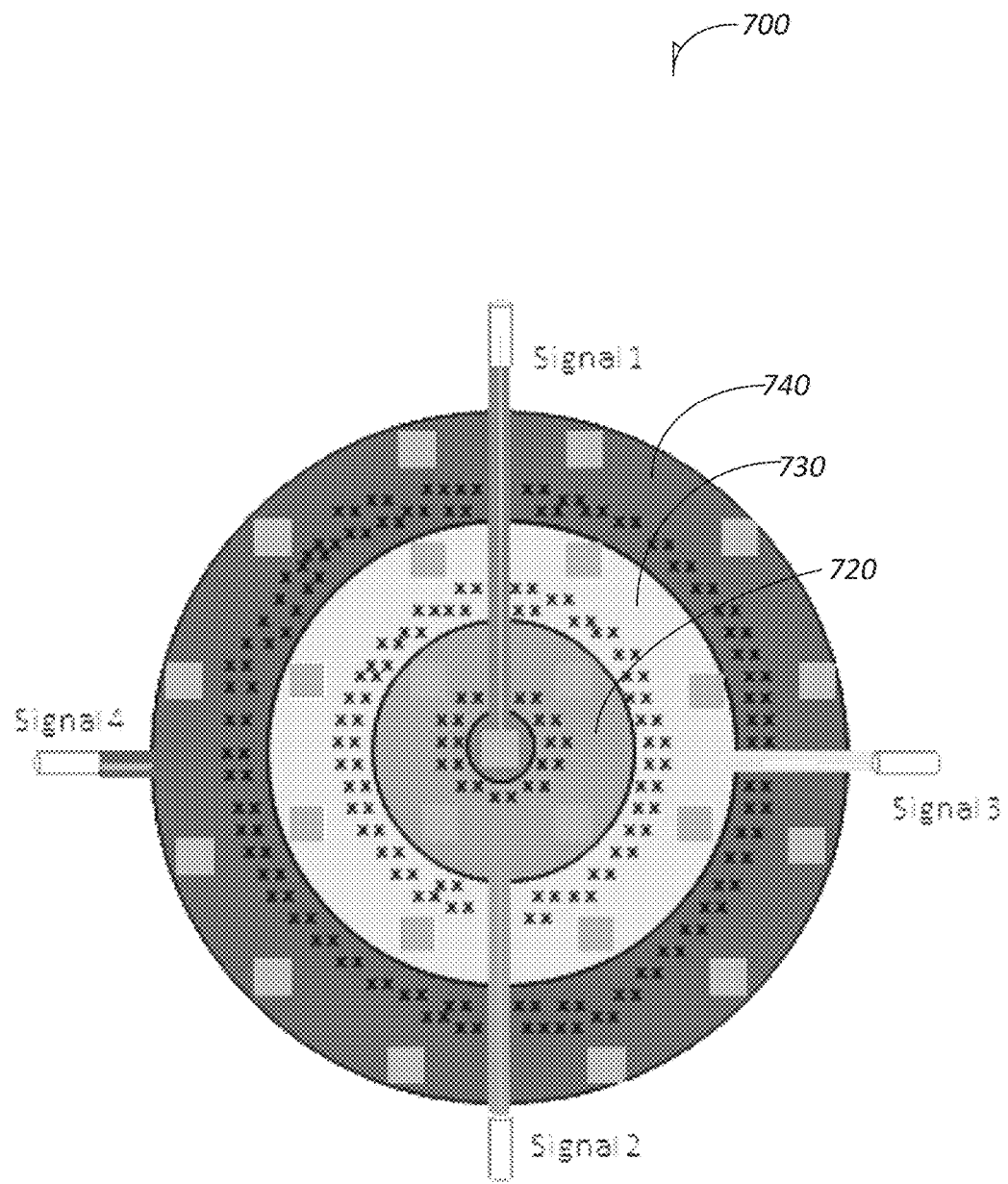
FIG. 7 illustrates a top view of concentric antenna array for OAM mode generation, showing one-wavelength (or more) separation spacing between rings, using subwavelength frequency selective structures to reduce mutual coupling between the concentric array rings in accordance with some embodiments.

One challenge associated with using a concentric antenna array ring is that the antenna elements on each ring may strongly couple with the antenna elements on other rings. This has the potential of impairing the far field OAM beam mode structure. One approach to reduce mutual coupling between the concentric array rings is to create at least a one-wavelength separation space (i.e., 5 mm at 60 GHz) between each ring array, and incorporate subwavelength frequency selective structures within this separation space to suppress any coupling fields. In one embodiment, electromagnetic band gap (EBG) structures may be used. EBG structures are known for their frequency selective behavior, these structures would be tuned and optimized to forbid the propagation of surface waves at the array's frequency(ies) of operation from ring to ring. FIG. 7 illustrates a top view of a concentric antenna array for OAM mode generation, showing one-wavelength (or more) separation spacing between rings, using subwavelength frequency selective structures to reduce mutual coupling between the concentric array rings in accordance with some embodiments. The 'x' symbols in FIG. 7 represent the frequency selective structures and may take on a number of geometrical shapes and locations within a ring.

Figure 8:
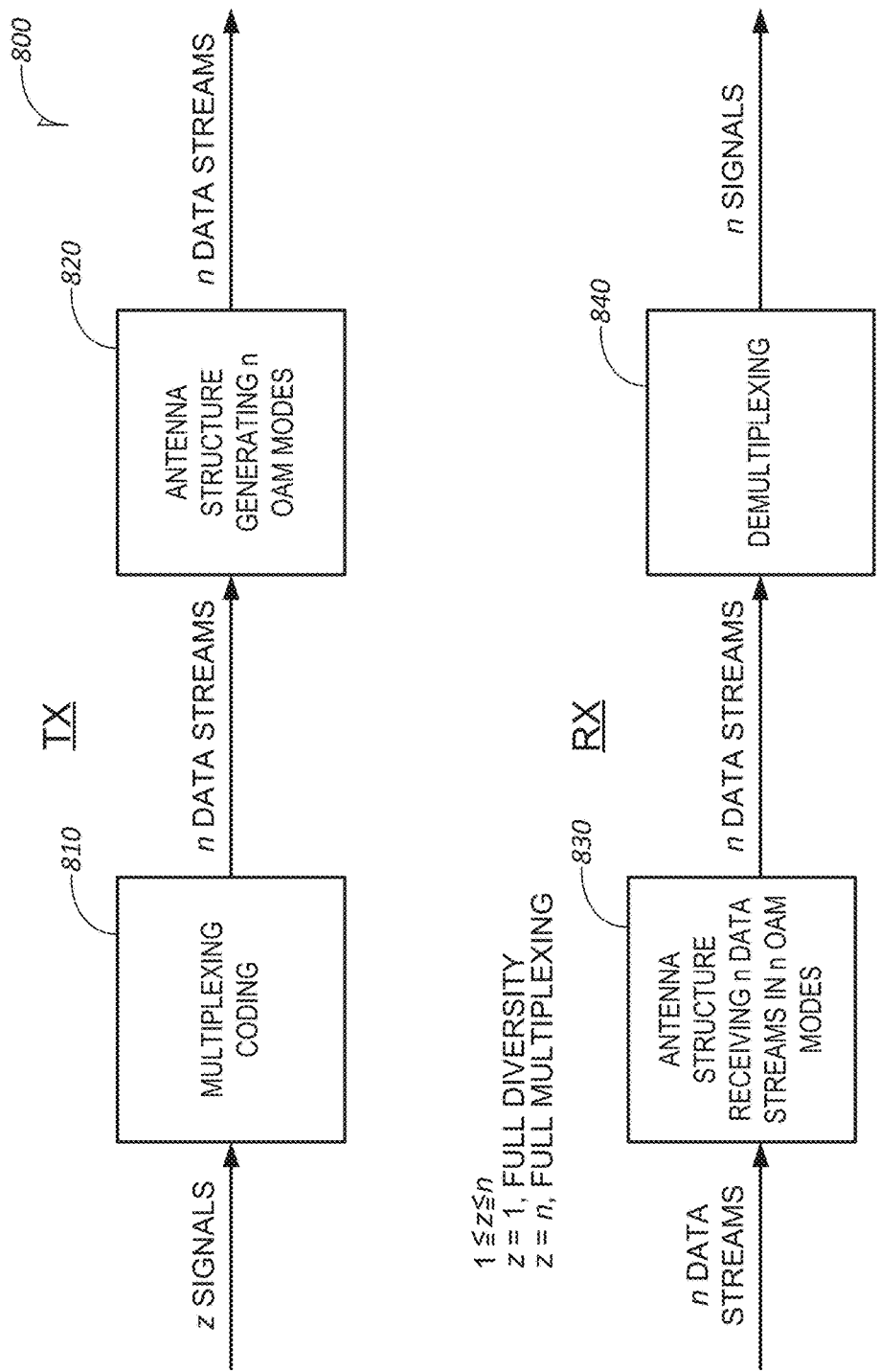
FIG. 8 is a flowchart illustrating dataflow in accordance with sonic embodiments.

FIG. 8 is a flowchart illustrating dataflow in accordance with sonic embodiments. In FIG. 8 dataflow 800 shows the relationship of data streams at the transmitter TX and at the receiver RX. At transmitter TX there are z signals into the multiplexing coding function 810. n data streams exit multiplex coding function 810 and are presented to antenna structure 820 for generating n OAM modes for the transmission of n data streams in n OAM beams exiting antenna structure 820. These n data streams represent n RF chains and may be in full multiplexing where n data streams each with different data content are mapped to n OAM modes or full diversity where n data streams each with the same data content are mapped to n OAM modes. Further, these n streams may be in partial diversity and partial multiplexing where x of n data streams have the same data content and y of the n data streams each have different data content, where x+y=n. In any case, the n data streams are mapped to n OAM modes for transmission. This is seen in the equation chart of FIG. 8 where z represents the data content of the z signal input to multiplexing coding function 810. The quantity z ranges from 1 to n. If z =1, representing n data streams each with the same data content (the z signals each comprise the same data content), transmission is at full diversity. If z=n, (the z signals each comprise different data content), the transmission is at full multiplexing. If z is between 1 and n then x of the z signals comprise the same data content and y of the z signals comprise different data content and the transmission is at partial diversity and partial multiplexing, where x+y=z.

At the receiver, RX, of FIG. 8, the n data streams are received at antenna structure 830 which receives the n data streams in n OAM modes. The n data streams are demultiplexed at demultiplexing function 840 which provides as output n signals that were input to multiplexing coding function 810. Again the data content of the output of n signals may be each the same data content if the transmission was at full diversity (z=1), each of different data content if the transmission was at full multiplexing (z=n), or x data signals of the same content and y data signals of different content, where x+y=n, for partial diversity and partial multiplexing.

Figure 9:
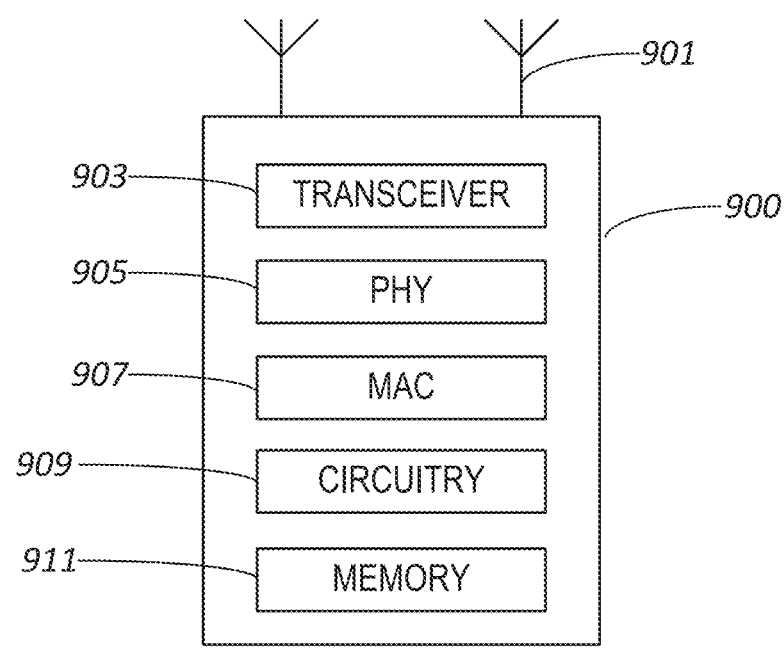
FIG. 9 illustrates a HEW device in accordance with some embodiments.

FIG. 9 illustrates a HEW device 900 in accordance with some embodiments. HEW device 900 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 900 may be suitable for operating as master station 102 (FIG. 1) or a HEW STA 104 (FIG. 1). In accordance with embodiments, HEW device 900 may include, among other things, a transmit/receive element 901 (for example an antenna), a transceiver 903, physical (PHY) circuitry 905, and media access control (MAC) circuitry 907. PHY circuitry 905 and MAC circuitry 907 may be HEW compliant layers and may also be compliant with one or more legacy IEEE 802.13 standards. MAC circuitry 907 may be arranged to configure packets such as a physical layer convergence procedure (PLCP) protocol data unit (PPDUs) and arranged to transmit and receive PPDUs, among other things. HEW device 900 may also include circuitry 909 and circuitry 909 configured to perform the various operations described herein. The circuitry 909 may be coupled to the transceiver 903, which may be coupled to the transmit/receive element 901, While FIG. 9 depicts the circuitry 909 and the transceiver 903 as separate components, the circuitry 909 and the transceiver 903 may be integrated together in an electronic package or chip.

In some embodiments, the MAC circuitry 907 may be arranged to contend for a wireless medium during a contention period to receive control of the medium for the HEW control period and configure an HEW PPDU. In some embodiments, the MAC circuitry 907 may be arranged to contend for the wireless medium based on channel contention settings, a transmitting power level, and a CCA level.

The PHY circuitry 905 may be arranged to transmit the HEW PPDU. The PHY circuitry 905 may include circuitry for modulation/demodulation, upconversion/downconversion, filtering, amplification, etc. In some embodiments, the circuitry 909 may include one or more processors. The circuitry 909 may be configured to perform functions based on instructions being stored in a RAM or ROM, or based on special purpose circuitry. The circuitry 909 may include processing circuitry and/or transceiver circuitry in accordance with some embodiments. The circuitry 909 may include a processor such as a general purpose processor or special purpose processor. The circuitry 909 may implement one or more functions associated with transmit/receive elements 901, the transceiver 903, the PHY circuitry 905, the MAC circuitry 907, and/or the memory 911.

In some embodiments, the circuitry 909 may be configured to perform one or more of the functions and/or methods described herein and/or in conjunction with FIGS. 1-8.

In some embodiments, the transmit/receive elements 901 may be two or more antennas that may be coupled to the PHY circuitry 904 and arranged for sending and receiving signals including transmission of the HEW packets. The transceiver 902 may transmit and receive data such as HEW PPDU and packets that include an indication that the HEW device 900 should adapt the channel contention settings according to settings included in the packet. The memory 910 may store information for configuring the other circuitry to perform operations for configuring and transmitting HEW packets and performing the various operations to perform one or more of the functions and/or methods described herein and/or in conjunction with FIGS. 1-10

In some embodiments, the HEW device 900 may be configured to communicate using OFDM communication signals over a multicarrier communication channel. In some embodiments. HEW device 900 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 900 may use 4x symbol duration of 802.11n or 802.11ac.

In some embodiments, an HEW device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 901 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas may be effectively separated to take advantage of spatial diversity and the different channel characteristics that may result.

HEW device 900 may alternately be called User Equipment (UE), which may be configured to operate as a HEW device or other wireless device. In some embodiments, the UE may be configured to operate at millimeter wave frequencies. In some embodiments the UE may be configured to operate in accordance with 5G. In some 5G embodiments, a UE may communicate data (e.g., using a PDSCH and/or a PUSCH) with a small cell or secondary cell while configured by a larger serving cell or primary cell and receiving control signals from the primary cell (with a PDCCH). In these embodiments, communications with the smaller cell may take place using mmW frequencies while communications with the larger cell may take place using microwave frequencies.

Although the HEW device 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 900 to perform the methods and/or operations described herein. The instructions may be in any suitable form, such as hut not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 10:
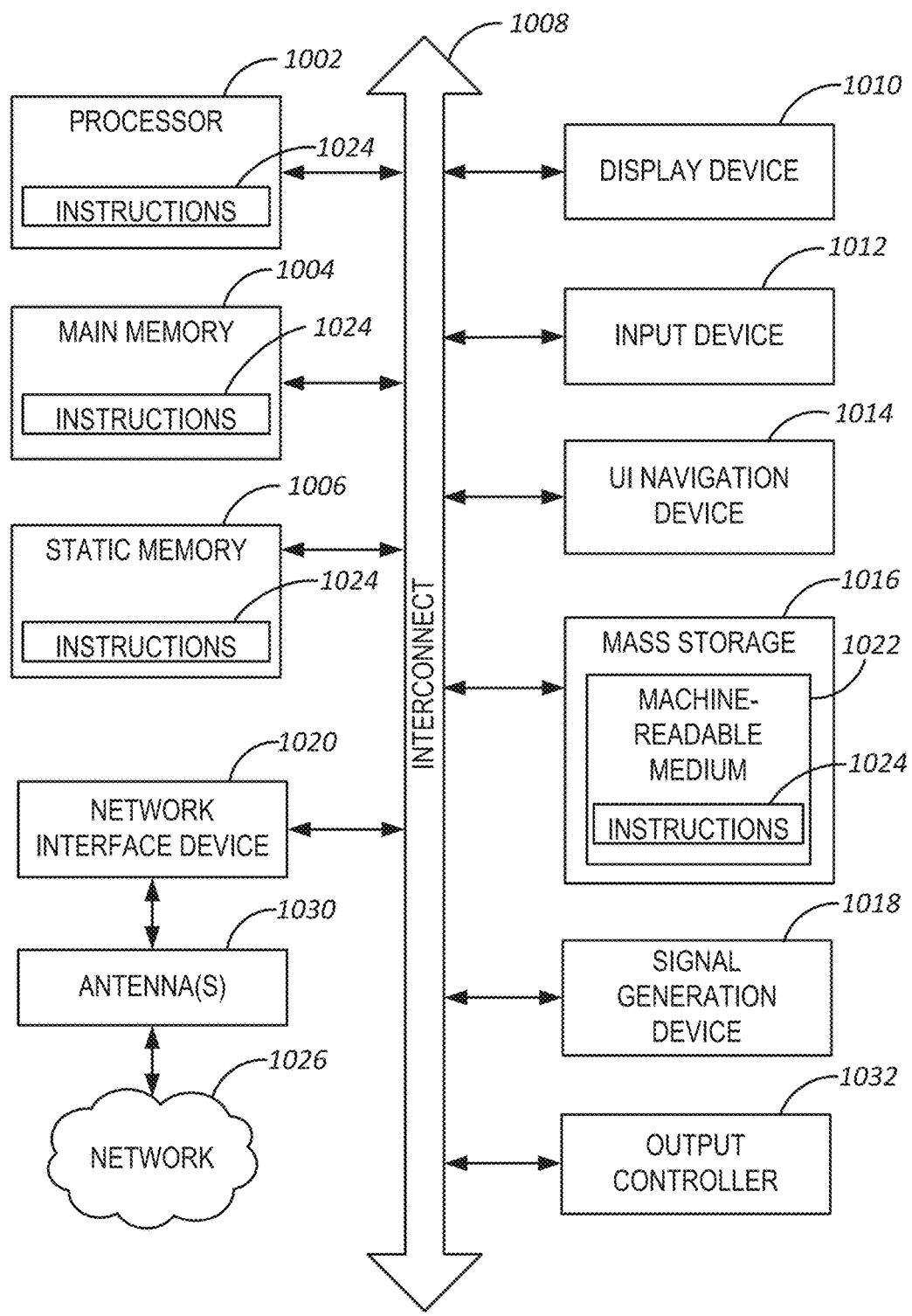
FIG. 10 illustrates a block diagram of an example machine in accordance with some embodiments.

FIG. 10 illustrates a block diagram of an example machine 1050 in accordance with some embodiments, upon which any one or more of the techniques (e.g., methodologies) discussed herein may perform. In alternative embodiments, the machine 1050 may operate as a standalone device or may be connected (e.g., networked) to other machines. In a networked deployment, the machine 1050 may operate in the capacity of a server machine, a client machine, or both in server-client network environments. In an example, the machine 1050 may act as a peer machine in peer-to-peer (P2P) (or other distributed) network environment. The machine 1050 may be a <UE/eNodeB/AP/STA/ETC>, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) may include a hardware processor 1002 (e.g., a central processing unit (CPU), a graphics processing unit (GPU), a hardware processor core, or any combination thereof), a main memory 1004 and a static memory 1006, 1006, some or all of which may communicate with each other via an interlink (e.g., bus) 1008. The machine 1050 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1050 may additionally include a storage device (e.g., drive unit) 1016, a signal generation device 1018 (e.g., a speaker), a network interface device 1020, and one or more sensors, such as a global positioning system (GPS) sensor, compass, accelerometer, or other sensor. The machine 1050 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software. Test

EXAMPLES

Example 1 is an apparatus of an access point (AP), the apparatus comprising: a transceiver and an array of antenna elements, the array arranged as a plurality of concentric rings of antenna elements, each of the plurality of concentric rings of antenna elements configured to receive a respective signal from the transceiver, each respective signal to have a continuously varying progressive phase between antenna elements of the respective concentric ring, to cause the array to generate a plurality of respective electromagnetic orbital angular momentum (OAM) beams each having a respective OAM mode, the beams being orthogonal to each other when generated.

In Example 2, the subject matter of Example 1 optionally includes wherein the plurality of concentric rings comprises n concentric rings and each concentric ring generates a respective OAM beam of OAM mode m where m is an integer ranging from 0 to ±n.

In Example 3, the subject matter of Example 2 optionally includes wherein the circumferential phase profile of the signal for a concentric ring that comprises α antenna elements is $2\pi m$ radians, where m is the respective OAM mode generated by the concentric ring of α antenna elements, and the progressive phase difference between each of the α antenna elements is $2\pi m/\alpha$ radians.

In Example 4, the subject matter of any one or more of Examples 2-3 optionally include wherein there are n beams and n OAM modes and the transceiver is configured to map n data streams each comprising different data content to the n beams.

In Example 5, the subject matter of any one or more of Examples 2-4 optionally include wherein there are n beams and n OAM modes and the transceiver is configured to map n data streams each comprising the same data content to each of the n beams.

In Example 6, the subject matter of any one or more of Examples 2-5 optionally include wherein there are n beams and n OAM modes and the transceiver is configured to map x data streams each comprising the same data content to each of x of the n beams and y data streams each comprising different data content toy of the n beams, where x+y=n.

In Example 7, the subject matter of Example 6 optionally includes wherein the transceiver comprises a data processor, the transceiver transmits the n beams to a station (STA), the access point to receive demodulation quality information fed back to the transceiver by the STA after demodulation of information in then beams by the STA, and the value of x and the value of y are calculated by the data processor from the demodulation quality information.

In Example 8, the subject matter of any one or more of Examples 1-7 optionally include wherein the plurality of concentric rings comprises a plurality of pairs of concentric rings and there is at least a one-wavelength separation space between each pair of the plurality of pairs of concentric rings.

In Example 9, the subject matter of Example 8 optionally includes wherein at least one frequency selective structure is incorporated within a separation space between at least one pair of concentric rings to suppress coupling fields between respective beams generated by each concentric ring of the at least one pair of concentric rings.

In Example 10, the subject matter of Example 9 optionally includes wherein the at least one frequency selective structure is an electromagnetic bandgap structure.

In Example 11, the subject matter of any one or more of Examples 1-10 optionally include wherein the number of modes ranges from 0 to ±n, the modes increase from a low of 0 mode to higher modes, the radii of the concentric rings increase from lower radii to higher radii, and the higher modes are generated by concentric rings having higher radii.

Example 12 is therein a set of instructions which, when executed by one or more processors of a transceiver, configures the transceiver to: cause generation of a plurality of respectively orthogonal electromagnetic OAM beams by energization of an array of antenna elements as a plurality of concentric rings of antenna elements, each respective concentric ring energized with a respective signal having a continuously varying progressive phase between antenna elements of the respective concentric ring.

In Example 13, the subject matter of Example 12 optionally includes wherein the plurality of concentric rings comprises n concentric rings, and each concentric ring generates a respective OAM beam of OAM mode m where m is an integer ranging from 0 to ±n.

In Example 14, the subject matter of Example 13 optionally includes wherein the circumferential phase profile of the respective signal for a concentric ring that comprises α antenna elements is $2\pi m$ radians where in is the respective OAM mode generated by the concentric ring of α antenna elements, and the progressive phase difference between each of the α antenna elements is $2\pi m/\alpha$ radians.

In Example 15, the subject matter of any one or more of Examples 13-14 optionally include wherein there are n beams and n OAM modes, and the executed set of instructions further configures the transceiver to map n data streams each comprising different data content to the n beams.

In Example 16, the subject matter of any one or more of Examples 13-15 optionally include wherein there are n beams and n OAM modes, and the executed set of instructions further configures the transceiver to map n data streams each comprising the same data content the n beams.

In Example 17, the subject matter of any one or more of Examples 13-16 optionally include wherein there are n beams and n OAM modes, and the executed set of instructions further configures the transceiver to map x data streams each comprising the same data content to x of the n beams and y data streams each comprising different data content to y of then beams, where x+y=n.

In Example 18, the subject matter of Example 17 optionally includes wherein the executed instruction set further configures the transceiver to transmit the transmitted beams to a User Equipment (UE) for demodulation of the n beams and to feed back demodulation quality information to the transceiver, and the executed instruction set further configures the transceiver to receive the demodulation quality information and to calculate the value of x and the value of y using the demodulation quality information.

In Example 19, the subject matter of any one or more of Examples 12-18 optionally include wherein the number of modes ranges from 0 to n, the modes increase from a low of 0 mode to higher modes, the radii of the concentric rings increase from lower radii to higher radii, and the executed instruction set further configures the transceiver to sequence each respective signal to cause the generation of the higher OAM modes by concentric rings having higher radii.

Example 20 is an apparatus of User Equipment (UE) comprising processing circuitry and transceiver circuitry configured for communicating with an enhanced node B (eNB), the transceiver circuitry arranged to: receive contemporaneously, from the apparatus, a plurality of orthogonal electromagnetic OAM beams comprising information to be demodulated; demodulate information in the plurality of orthogonal electromagnetic OAM beams; the processing circuitry arranged to: determine the quality of the demodulation of the plurality of orthogonal electromagnetic beams; and feed back demodulation quality information to the eNB for the eNB to use to determine whether to transmit the plurality of orthogonal electrometric OAM beams in full multiplexing mode, full diversity mode, or partial diversity mode.

In Example 21, the subject matter of Example 20 optionally includes wherein each respective electronic OAM beam of the plurality of orthogonal electromagnetic OAM beams is of a respective OAM mode m where m is an integer ranging from 0 to ±n.

In Example 22, the subject matter of any one or more of Examples 20-21 optionally include wherein the information in each respective OAM beam comprises the same data content.

In Example 23, the subject matter of any one or more of Examples 20-22 optionally include wherein the information in each respective OAM beam comprises different data content.

In Example 24, the subject matter of any one or more of Examples 20-23 optionally include wherein there are n OAM beams and the information in then OAM beams comprises the same data content in x of the n beams and different data content in y of then beams, where x+y=n.

Example 25 is a method of operation of an apparatus of an Access Point (AP), the apparatus comprising a transceiver and an array of antenna elements, comprising: generating a plurality of respective orthogonal electromagnetic OAM beams, each beam having a respective OAM mode and being orthogonal to other of the OAM beams when generated, by energizing the array of antenna elements as a plurality of concentric rings of antenna elements, each respective concentric ring energized with a respective signal having a continuously varying progressive phase between antenna elements of the respective concentric ring; and transmitting the plurality of electromagnetic OAM beams into free space.

In Example 26, the subject matter of Example 25 optionally includes wherein the plurality of concentric rings comprises n concentric rings, the method further comprising each concentric ring generating a respective OAM beam of OAM mode m where m is an integer ranging from 0 to ±n.

In Example 27, the subject matter of Example 26 optionally includes wherein the circumferential phase profile of the signal for a concentric ring that comprises α antenna elements is $2\pi m$ radians where m is the respective OAM mode generated by the concentric ring of α antenna elements, and the progressive phase difference between each of the α antenna elements is $2\pi m/\alpha$ radians.

In Example 28, the subject matter of any one or more of Examples 26-27 optionally include wherein there are n beams and n OAM modes, the method further comprising one of mapping n data streams each comprising different data content to the n beams, mapping n data streams each comprising the same data content to each of the n beams, or mapping the x data streams each comprising the same data steam to x of the n beams and y data streams each comprising different data content to y of the n beams, where x+y=n.

In Example 29, the subject matter of Example 28 optionally includes, the method further comprising receiving the transmitted beams by a station (STA) for demodulation of the n beams and feeding back demodulation quality information to the apparatus, for calculation of the value of x and the value of y by a processor of the apparatus using the demodulation quality information.

In Example 30, the subject matter can include, or can optionally be combined with any portion or combination of, any portions of any one or more of Examples 1 through 29 to include, subject matter that can include means for performing any one or more of the functions of Examples 1 through 29, or a machine-readable medium including instructions that, when performed by a machine, cause the machine to perform any one or more of the functions of Examples 1 through 29.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more," In this document, the term "or" is used to refer to a. nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein," Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The invention claimed is:

1. An apparatus of an access point (AP), the apparatus comprising:
   a transceiver and an array of antenna elements, the array arranged as a plurality of concentric rings of antenna elements, each of the plurality of concentric rings of antenna elements configured to receive a respective signal from the transceiver,
   each respective signal to have a varying progressive phase between a plurality of antenna elements of the respective concentric ring,
   wherein the plurality of concentric rings of antenna elements is configured to generate a plurality of respective electromagnetic orbital angular momentum (OAM) beams with the array, wherein each of the respective OAM beams has a respective OAM mode, and wherein the plurality of OAM beams are orthogonal to each other when generated.

2. The apparatus of claim 1 wherein the plurality of concentric rings comprises n concentric rings and each concentric ring generates a respective OAM beam of OAM mode m where m is an integer ranging from 0 to ±n.

3. The apparatus of claim 2 wherein the circumferential phase profile of the signal for a concentric ring that comprises a antenna elements is about $2\pi m$ radians, where m is the respective OAM mode generated by the concentric ring of $\alpha$ antenna elements, and the progressive phase difference between each of the a antenna elements is about $2\pi m/\alpha$ radians.

4. The apparatus of claim 2 wherein there are n beams and n OAM modes and the transceiver is configured to map n data streams each comprising different data content to the n beams.

5. The apparatus of claim 2 wherein there are n beams and n OAM modes and the transceiver is configured to map n data streams each comprising the same data content to each of the n beams.

6. The apparatus of claim 2 wherein there are n beams and n OAM modes and the transceiver is configured to map x data streams each comprising the same data content to each of x of the n beams and y data streams each comprising different data content to y of the n beams, where x+y=n.

7. The apparatus of claim 6 wherein the transceiver comprises a data processor, the transceiver transmits the n beams to a station (STA), the access point to receive demodulation quality information fed back to the transceiver by the STA after demodulation of information in the n beams by the STA, and the value of x and the value of y are calculated by the data processor from the demodulation quality information.

8. The apparatus of claim 1 wherein the plurality of concentric rings comprises a plurality of pairs of concentric rings and wherein each pair of the plurality of pairs of concentric rings comprises at least a one-wavelength separation space in between.

9. The apparatus of claim 8 wherein at least one frequency selective structure is incorporated within a separation space between at least one pair of concentric rings to suppress coupling fields between respective beams generated by each concentric ring of the at least one pair of concentric rings.

10. The apparatus of claim 9 wherein the at least one frequency selective structure is an electromagnetic bandgap structure.

11. The apparatus of claim 1 wherein the number of modes ranges from 0 to ±n, the modes increase from a low of 0 mode to higher modes, the radii of the concentric rings increase from lower radii to higher radii, and the higher modes are generated by concentric rings having higher radii.

12. One or more computer-readable hardware storage device having embedded therein a set of instructions which, when executed by one or more processors of a transceiver, configures the transceiver to:
   cause generation of a plurality of respectively orthogonal electromagnetic OAM beams by energization of an array of antenna elements as a plurality of concentric rings of antenna elements, each respective concentric ring energized with a respective signal having a varying progressive phase between antenna elements of the respective concentric ring.

13. The one or more computer-readable hardware storage device of claim 12 wherein the plurality of concentric rings comprises n concentric rings, and each concentric ring generates a respective OAM beam of OAM mode m where m is an integer ranging from 0 to ±n.

14. The one or more computer-readable hardware storage device of claim 13 wherein the circumferential phase profile of the respective signal for a concentric ring that comprises α antenna elements is 2πm radians where in is the respective OAM mode generated by the concentric ring of α antenna elements, and the progressive phase difference between each of the α antenna elements is 2πm/α radians.

15. The one or more computer-readable hardware storage device of claim 13 wherein there are n beams and n OAM modes, and the executed set of instructions further configures the transceiver to map n data streams each comprising different data content to the n beams.

16. The one or more computer-readable hardware storage device of claim 13 wherein there are n beams and n OAM modes, and the executed set of instructions further configures the transceiver to map n data streams each comprising the same data content the n beams.

17. The one or more computer-readable hardware storage device of claim 13 wherein there are n beams and n OAM modes, and the executed set of instructions further configures the transceiver to map x data streams each comprising the same data content to x of the n beams and y data streams each comprising different data content to y of the n beams, where x+y=n.

18. The one or more computer-readable hardware storage device of claim 17 wherein the executed instruction set further configures the transceiver to transmit the transmitted beams to a User Equipment (UE) for demodulation of the n beams and to feed back demodulation quality information to the transceiver, and the executed instruction set further configures the transceiver to receive the demodulation quality information and to calculate the value of x and the value of y using the demodulation quality information.

19. The one or more computer-readable hardware storage device of claim 12 wherein the number of modes ranges from 0 to n, the modes increase from a low of 0 mode to higher modes, the radii of the concentric rings increase from lower radii to higher radii, and the executed instruction set further configures the transceiver to sequence each respective signal to cause the generation of the higher OAM modes by concentric rings having higher radii.

20. An apparatus of User Equipment (UE) comprising processing circuitry and transceiver circuitry configured for communicating with an enhanced node B (eNB), the transceiver circuitry arranged to:
receive contemporaneously, from the eNB, a plurality of orthogonal electromagnetic OAM beams comprising information to be demodulated;
demodulate information in the plurality of orthogonal electromagnetic OAM beams to generate demodulation quality information;
the processing circuitry arranged to:
feed back demodulation quality information to the eNB for the eNB to use to determine whether to transmit the plurality of orthogonal electrometric OAM beams in full multiplexing mode, full diversity mode, or partial diversity mode, wherein there are n OAM beams and the information in the n OAM beams comprises the same data content in x of the n beams and different data content in y of the n beams, where x+y=n.

21. The apparatus of claim 20 wherein each respective electronic OAM beam of the plurality of orthogonal electromagnetic OAM beams is of a respective OAM mode m where m is an integer ranging from 0 to ±n.

22. A method of operation of an apparatus of an Access Point (AP), the apparatus comprising a transceiver and an array of antenna elements, comprising:
generating a plurality of respective orthogonal electromagnetic OAM beams, each beam having a respective OAM mode and being orthogonal to other of the OAM beams when generated, by energizing the array of antenna elements as a plurality of concentric rings of antenna elements, each respective concentric ring energized with a respective signal having a varying progressive phase between antenna elements of the respective concentric ring; and
transmitting the plurality of electromagnetic OAM beams into free space.

23. The method of claim 22 wherein the plurality of concentric rings comprises n concentric rings, the method further comprising each concentric ring generating a respective OAM beam of OAM mode m where m is an integer ranging from 0 to ±n.

24. The method of claim 23 wherein the circumferential phase profile of the signal for a concentric ring that comprises α antenna elements is 2πm radians where m is the respective OAM mode generated by the concentric ring of α antenna elements, and the progressive phase difference between each of the α antenna elements is 2πm/α radians.

25. The method of claim 23 wherein there are n beams and n OAM modes, the method further comprising one of
mapping n data streams each comprising different data content to the n beams,
mapping n data streams each comprising the same data content to each of the n beams, or
mapping the x data streams each comprising the same data steam to x of the n beams and y data streams each comprising different data content to y of then beams, where x+y=n.

26. The method of claim 25, the method further comprising receiving the transmitted beams by a station (STA) for demodulation of the n beams and feeding back demodulation quality information to the apparatus, for calculation of the value of x and the value of y by a processor of the apparatus using the demodulation quality information.

* * * * *

UNITED STATES PATENT AND TRADEMARK OFFICE
CERTIFICATE OF CORRECTION

PATENT NO. : 10,511,092 B2
APPLICATION NO. : 14/977340
DATED : December 17, 2019
INVENTOR(S) : Sajuyigbe et al.

Page 1 of 1

It is certified that error appears in the above-identified patent and that said Letters Patent is hereby corrected as shown below:

In the Claims

In Column 22, Line 10, in Claim 3, delete "a" and insert --α-- therefor

In Column 22, Line 13, in Claim 3, delete "a" and insert --α-- therefor

In Column 23, Line 6, in Claim 14, delete "in" and insert --m-- therefor

In Column 24, Line 46, in Claim 25, delete "then" and insert --n-- therefor

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*